United States Patent
Howard et al.

(10) Patent No.: US 6,278,966 B1
(45) Date of Patent: Aug. 21, 2001

(54) METHOD AND SYSTEM FOR EMULATING WEB SITE TRAFFIC TO IDENTIFY WEB SITE USAGE PATTERNS

(75) Inventors: Steven Kenneth Howard, Irving, TX (US); David Charles Martin, San Jose; Mark Earl Paul Plutowski, Santa Cruz, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/099,622

(22) Filed: Jun. 18, 1998

(51) Int. Cl.$^7$ ............................................. G06F 9/455

(52) U.S. Cl. ......................... 703/23; 703/22; 703/26; 709/224; 714/28

(58) Field of Search .................... 703/22–26; 709/224; 702/229; 714/27, 28

(56) References Cited

U.S. PATENT DOCUMENTS

| | | | |
|---|---|---|---|
| 5,615,341 | | 3/1997 | Agrawal et al. . |
| 5,668,988 | * | 9/1997 | Chen et al. ................................ 707/2 |
| 5,796,952 | * | 8/1998 | Davis et al. .......................... 709/224 |
| 5,809,250 | * | 9/1998 | Kisor .................................... 709/224 |
| 5,926,631 | * | 7/1999 | McGarvey ............................. 703/23 |
| 5,931,912 | * | 8/1999 | Wu et al. .............................. 709/224 |
| 5,951,642 | * | 9/1999 | Onoe et al. ........................... 709/224 |
| 5,974,572 | * | 10/1999 | Weinberg et al. ...................... 714/47 |
| 5,999,975 | * | 12/1999 | Kittaka et al. ........................ 709/224 |
| 6,012,052 | * | 1/2000 | Altschuler et al. ...................... 707/2 |
| 6,044,398 | * | 3/2000 | Marullo et al. ....................... 703/22 |
| 6,096,096 | * | 8/2000 | Murphy et al. ........................ 703/23 |
| 6,182,025 | * | 1/2001 | Packer .................................. 703/24 |

OTHER PUBLICATIONS

Han et al, Discovery Of Multiple Level Association Rules Form Large Databases, Proceedings of the 21st International Conference on Very Large Data Bases, Zurich, Switzerland, Sep. 11–15, 1995, pp. 420–431.

H. Mannila et al, "Improved Methods For Finding Association Rules", Pub. No. C–1993–65, 20 pages, Univ. Helsinki, 1993.

Savascre et al, "An Efficient Algorithm For Mining Association Rules In Large Databases", Proceedings of the 21st VLDB Conference, Zurich, Switzerland, 1995, pp. 432–444.

Srikant et al, "Mining Generalized Association Rules", Proceedings of the 21st VLDB Conference, Zurich, Switzerland, 1995, pp. 407–419.

Ullah, "Entropy, divergence and distance measured with economic applications", *Journal Of Statistical Planning And Interence*, Elsevier 1993, pp. 137–163.

J.S. Park, et al, "Efficient Parallel Data Mining For Association Rules", IBM Research Report, RJ 20156, Aug. 1995.

(List continued on next page.)

*Primary Examiner*—Kevin J. Teska
*Assistant Examiner*—Douglas W. Sergent
(74) *Attorney, Agent, or Firm*—Gray Cary Ware & Friedenrich

(57) ABSTRACT

A method and device to generate behavior for emulated visitors traversing an internet web site. The visitors may display behavior that is indistinguishable from those of actual users, a subset of the actual users, or the behavior may be purely hypothetical, such as when a visitor acts without evidence of having made an intentional choice. The invention tracks the actions of the visitors and develops reference distributions that may be compared to a site's usage distributions as obtained from actual visitors to the site. The reference distributions are then used to implement statistical estimation methods that measure relative information content. The invention comprises a general implementation and a deterministic implementation. The general version may be applied to live production web sites, and the deterministic version is best suited to offline processing.

71 Claims, 9 Drawing Sheets

OTHER PUBLICATIONS

J.S. Park et al, "An Effective Hash Based Algorithm For Mining Association Rules", Proc. ACM–SIGMOD Conf. On Management of Data, San Jose, May 1994.

Agrawal et al, "Parallel Minining Of Association Rules: Design, Implementation, And Experience", IEEE Transaction On Knowledge Data Engineering, vol. 8, No. 6, pp. 962–969, Dec. 1996.

Argrawal et al, "Fast Algorithms For Mining Association Rules", Proceedings of the 1994 VLDB Conference, pp. 487–499, 1994.

Agrawal et al, "Mining Association Rules Between Sets of Items In Large Databases", Proc. 1993 ACM SIGMOD Conf. pp. 207–216, 1993.

Piatetsky–Shapiro, Chapter 13 "Discovery, Analysis, And Presentation Of Strong Rules", from *Knowledge Discovery in Databases*, pp. 229–248, AAAI/MIT,Press, Menlo Park, CA 1991.

Swami, "Research Report:Set–Oriented Mining For Association Rules", IBM Research Division, RJ 9567 (83573 Oct. 1993.

Ludwig et al. "Laboratory for Emulation and Study of Integrated and Coordinated Media Communication", Proc. ACM Workshop on Frontiers in Computer Communications Technology, pp. 283–291, Aug. 1987.*

Chen et al., "Data Mining for Path Traversal Patterns in a Web Environment", Proc. 16th International Conf. on Distributed Computing Systems, pp. 385–392, May 1996.*

Chen et al., "Efficient Data Mining for Path Traversal Patterns", IEEE Transactions on Knowledge and Data Engineering, vol. 10, Issue 2, pp. 209–211, Mar.–Apr. 1998.*

Cooley et al., "Grouoing Web Page Preferences into Transactions for Mining World Wide Web Browsing Patterns", Proc. Knowledge and Data Engineering Exchange Workshop, pp. 2–9, Nov. 1997.*

Hellerstein et al., "ETE: A Customizable Aproach to Measuring End–to–end Response Times and Their Components in Distributed Systems", Proc. IEEE 19th Inter. Conf. on Distributed Computing Systems, pp. 152–162, May 1999.*

Schubert et al., "Web Assessment–Measuring the Effectiveness of Electronic Commerce Sites Going Beyond Traditional Marketing Paradigms", Proc. of the 32nd Annual Hawaii Inter. Conf. on Systems Sciences, pp. 1–10, Jan. 1999.*

Barra et al., "Symmetric Adaptive Customer Modeling in an Electronic Store", Proc. Third IEEE Symposium on Computers and Communications, pp. 348–352, Jul. 1998.*

* cited by examiner

METHOD AND SYSTEM FOR EMULATING WEB SITE TRAFFIC TO IDENTIFY WEB SITE USAGE PATTERNS

BACKGROUND OF THE INVENTION

1. Field of the Invention

The present invention relates to a system to simulate the behavior of visitors navigating an internet web site. More particularly, the invention concerns a generative model to simulate hypothetical traffic over a web site, and to use this traffic in emulation of actual traffic observed at the web site.

2. Description of the Related Art

In internet web site (site) applications, database logs record the movement of traffic caused by visitors traversing a site. In medium to large sites, the amount of data that accumulates on a daily to weekly basis is immense. Commonly, this data contains a great deal of information about the behaviors of visitors to the web site; however, analyzing it using conventional statistical tools is prohibitive due to the sheer volume of data.

Instead data mining tools may be used to analyze the data and to automatically "discover" interesting patterns and relationships within the data. Such data mining tools are association rule discovery methods such as those disclosed in R. Srikant et al., "Mining Generalized Association Rules," 1995, *Proceedings of the 21st VLDB Conference*, Zurich, Switzerland, and R. Agrawal et al., "Fast Discovery of Association Rules," 1996, *Advances in Knowledge Discovery and Data Mining*, U. M. Fayyad et al., eds. AAAI Press/The MIT Press, Menlo Park, Calif., USA. These types of association rules can be used to identify patterns in a transaction database, where a transaction is a visitation session that occurs when a user peruses a web site. A web site server records the actions of users to the site in a "web log" database. This database is "sessionized" by identifying sequences of actions that correspond to distinct visits. Applied to such a sessionized web log, association rules can be used to discover the presence of content usage patterns (traffic flow) over a web site. Such rules may deliver statements of the form "75% of visits of referrer A belong to segment B," or "45% of visitors to page A also visit page B."

One problem that arises in the internet web site domain due to the sheer volume of data that can be generated by a site with heavy user traffic is that saving all this data for future reference can be prohibitively expensive. One way to reduce the size of the data is to compress it into a set of summary statistics. However, this requires considerable foresight in choosing the set of statistics and does not allow one to posit questions that are only apparent at a later date.

Although the internet is relatively new and few inventions exist for application to the internet in general much less to web sites in particular, computer science, discrete mathematics, and graph theory provide significant guidance in modeling static graphs. Given a static and completely described web page, such models can be applied to estimate the traffic flow over such a site without need to resort to a generative model or probabilistic simulation. However, characteristics of present day web sites preclude the application of such classical graph theoretic tools.

Present day web sites tend to be dynamic, not static, and cannot be completely described in advance. Web pages can be constructed dynamically, or links between pages can be created dynamically, thereby yielding a dynamic cyclic graph structure. Even web sites that are relatively static in that their design—such as websites that are stable over a span of a few weeks and do not rely upon dynamic page creation or dynamic link creations—are extremely difficult or tedious to model using conventional graph modeling tools due to the sheer size of the connected graph and the special nature of visitor behavior.

To overcome these difficulties, there is a pressing need for an invention that automates the step of "describing" a graph to a web site modeling tool, and that automatically takes into account the special nature of web site users themselves such that the model not only accounts for the topology of the web site but also accounts for regularities evident in user traffic. The invention should be capable of generating a distribution of visitor behavior that results if visitors demonstrate no preferences and were influenced mostly by the site topology. This emulated distribution could then be used as a reference distribution against which the distribution generated by actual users could be compared.

Preferably, the user characteristics processed by such an invention should also be reducible into a small number of descriptive statistics that, along with web site topography, could be used to emulate user behavior and approximate summary statistics not anticipated at the time the original data was collected. This would allow the statistics to be applied to determine "future" visitor behavior, such as how past users would behave today when navigating a site topology previously unavailable.

SUMMARY OF THE INVENTION

Broadly, the present invention concerns a method and apparatus for generating hypothetical web site traffic that simulates the behavior of actual web site users. Data Mining Association Rules may be applied to this simulated traffic and used to identify usage patterns for users of a web site, such as discussed in the U.S. patent application entitled "ASSOCIATION RULE RANKER FOR WEB SITE EMULATION" by Steven Howard et al., assigned to the assignee of the current invention, incorporated by reference herein and being filed concurrently herewith.

Further, the present invention includes a method to discount topology affected rules. For example, one may use the present invention Web Walk Emulator to generate the distribution of visitor behavior that would result if visitors demonstrated no personal preferences and were influenced mostly by the site topology alone. This "emulated" distribution can then be used as a reference distribution against which to compare the distribution generated by actual users who display personal preferences.

The present invention allows user characteristics to be compressed into a small number of descriptive statistics, which, along with the site topology, can be used to emulate visitor behavior at a later time. An example of this use is approximating novel summary statistics that were not anticipated at the time the original data was being collected.

In one embodiment, the invention may be implemented to provide a method to generate behavior for hypothetical visitors (visitors) traversing a site. This generated data emulates the behavior of actual users. The hypothetical visitors may display behavior that is indistinguishable from those of actual users, a subset of the actual users, or the behavior may be purely hypothetical, such as when a user acts without evidence of having made an intentional choice. The present invention tracks the actions of the visitors and develops reference distributions that may be compared to a site's usage distributions as obtained from actual visitors to the site. The reference distributions are then used in one embodiment of the invention to implement statistical estimation methods that measure relative information content, for example, Kullback-Liebler Information Criterion or the Bayesian criteria.

In another version of the method, the invention comprises a general implementation; another embodiment comprises a deterministic implementation. The general version may be applied to live production web sites. The deterministic version is suited to offline processing and not burdening the active web site with additional traffic. In another embodiment, this version also exploits certain types of data in order to reduce the cost of its implementation.

In another embodiment, the invention may be implemented to provide an apparatus for generating web site traffic that substantially emulates actual web site traffic. The apparatus may include storage, a processor, and an emulation system comprising various hardware components and circuitry.

In still another embodiment, the invention may be implemented to provide a signal-bearing medium tangibly embodying a program of machine-readable instructions executable by a digital data processing apparatus to perform method steps for generating web site traffic that emulates actual web site traffic.

The invention affords its users with a number of distinct advantages. In either the general or the deterministic embodiments, the invention generates visitor behavior that results if visitors to a web site do not demonstrate preferences but are influenced primarily by the topology of the web site alone. Another advantage is that user characteristics may be compressed into a small number of descriptive statistics that, along with site topology, may be used to emulate web site user behavior that was not anticipated at the time the original data was gathered. A further advantage is that emulated behaviors may be used to perform trend analysis on visitors' future behaviors, such as how visitors today would behave on a site topology being proposed for future use. The present invention is flexible enough to allow user emulations for web site behavior ranging from true life to purely hypothetical situations.

The invention also provides a number of other advantages and benefits, which should be apparent from the following description of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION

The nature, objects, and advantages of the invention will become more apparent to those skilled in the art after considering the following detailed description in connection with the accompanying drawings. As mentioned above, the invention concerns a generative model for generating hypothetical web site traffic that emulates actual web site traffic behavior.

These emulated behaviors can be used for a variety of applications such as performing trend analysis on visitor behaviors. The emulated behaviors are intended to be as realistic as possible, but may be applied to a situation that has not yet occurred, namely, how might past users behave today on a site having of a topology different than was available in the past. Simply put, a user emulation allows one to simulate web site usage behavior ranging from lifelike to purely hypothetical. For example, it might be shown:

- how traffic would distribute over the site if users showed no evidence of preference in their link selections (i.e., given a set of choices, they are equally likely to select any particular one); or
- how traffic would distribute over the site if users had slightly different preferences on a particular page. (Because users of a particular page can go on to visit an indefinite number of pages thereafter, and a slight local difference in preference can result in global changes in traffic over the entire site); or
- how the behavior of a set of known users can be reduced to a sufficient set of statistics (in particular, from which the aggregate behavior of the original users can be recovered); or
- how a known set of users would behave given a slight change in the web site topology.

I. Hardware Components & Interconnections

Figure 1A:
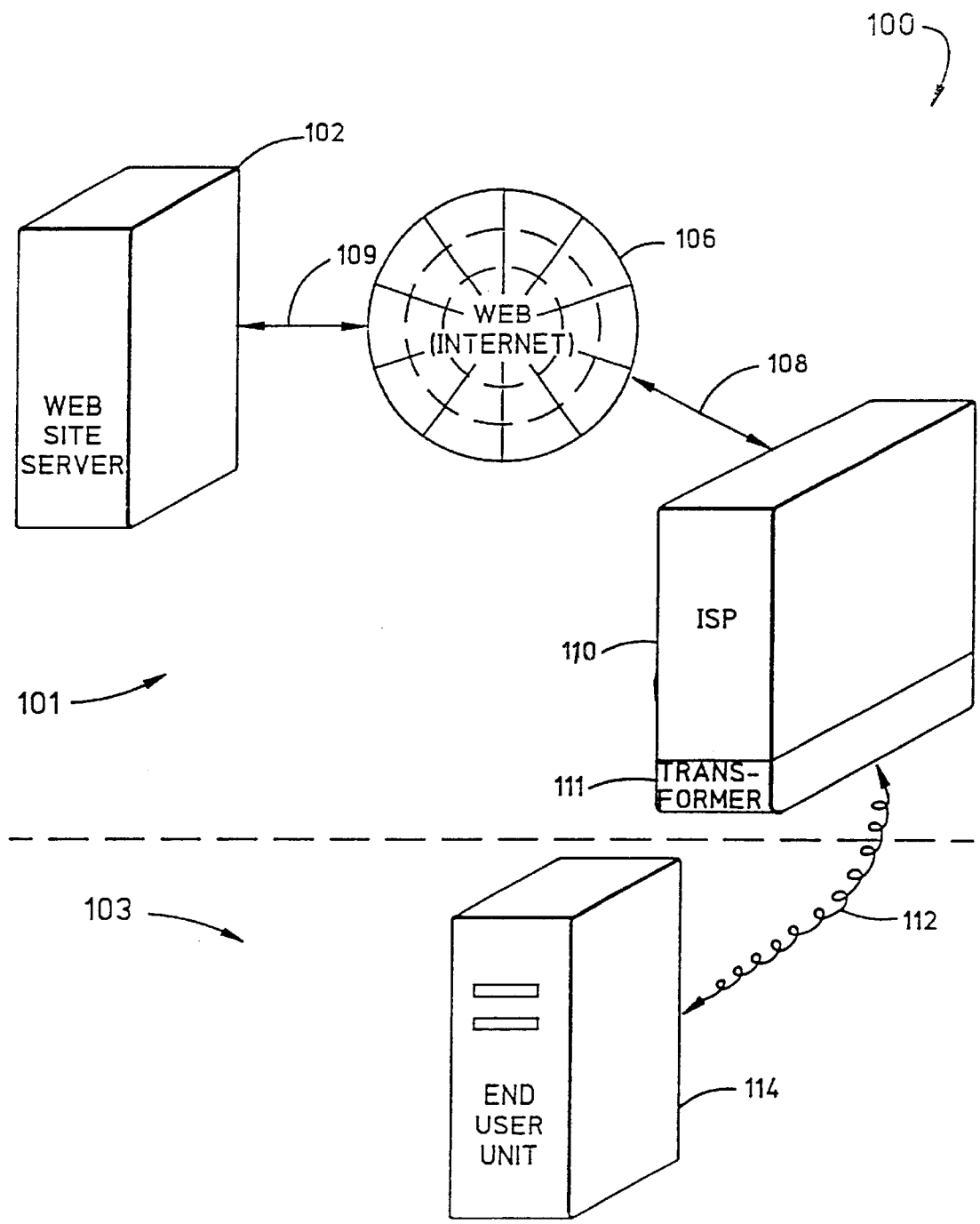
FIG. 1A is a block diagram of the hardware components and interconnections of a digital signal processing system used in accordance with one embodiment of the present invention.

One aspect of the invention concerns a digital signal processing system 100 used to generate visitor traffic over web site, which may be generally represented by the various hardware components and interconnections shown in FIG. 1.

In FIG. 1, the internet system 100 as shown comprises two parts, a first system 101 and a second system 103. The first system 101 may include a web site server 102 communicatively connected via a web 106 to an internet service provider (ISP) 110 using communication channels 108 and 109. Commonly, these types of communication channels are fast-link channels. The server 102 may act as a host location for data objects such as media or multimedia objects. In one embodiment, the server 102 may be a mainframe computer manufactured by the International Business Machines Corporation of Armonk, N.Y., and may use an operating system sold under trademarks such as MVS. Or, the server 102 may be a Unix computer, or OS/2 server, or Windows NT server or IBM RS/6000 530 workstation with 128 MB of main memory running AIX 3.2.5. The server 102 may incorporate a database system, such as DB2, IMS, or ORACLE, or it may access data on files stored on a data storage medium such as a WORM or disk, e.g., a 2 GB SCSI, 3.5" drive, or tape.

In another embodiment, the web site server 102 may comprise one or more magnetic data storage disks commonly referred to as direct access storage devices (DASD). As is well known in the art, the data objects may be stored by the server 102 in various formats depending upon the type of media.

The ISP 110 may be connected to the second system 103 comprising an end-user unit 116 via a communication media 112, commonly a slow-link channel, where the ISP 110 controls the passage of information between the web site server 102 and the user unit 114. "Fast-link" and "slow-link", as mentioned above, refer to the relative speed with which the communication channels 108, 109, and 112 can transfer a data object. In any case, the object transfer capabilities of the fast-link channel generally exceed those of the slow-link channel, and one or both links may comprise a line, bus, cable, electromagnetic link, microwave, radio signal, or other wireless means for exchanging commands, media objects, and other information and data between the web site server 102, the ISP 110, and the user unit 116.

Among other features, the ISP 110 may include a fire wall used as a means of reducing the risk of unwanted access to the user unit 114. Although the ISP 110 is pictured as a separate device, the ISP may be integral to the user unit 114. The ISP 110 may also include a transformer 111 that may be used to transform a media object and set and/or to implement transfer parameters to facilitate efficient transfer of the media object between the transformer 111 and the user unit 114. In another embodiment, the ISP 110 and the transformer 111 may be eliminated from the system 100, the ISP 110 may be eliminated and the transformer 111 integrate into the web site server 102 or be included within the second system 103 rather than the first system 101 as shown.

The end user unit 114 may include a processing unit (not shown), such as a microprocessor or other processing machine, communicatively coupled to a storage unit. The storage unit may also include a fast-access memory and may include nonvolatile storage (not shown). The fast-access memory preferably comprises random access memory, and may be used to store the programming instructions executed by the processing unit during execution of a computer program. The nonvolatile storage may comprise, for example, one or more magnetic data storage disks such as a "hard drive" or any other suitable storage device. Further, the end user unit 114 may include in one embodiment an output module for outputting or displaying program status results on a graphic display, print device or storage medium.

Despite the specific foregoing description, ordinarily skilled artisans (having the benefit of this disclosure) will recognize that the apparatus discussed above may be implemented in a machine of different construction, without departing from the scope of the invention. As a specific example, one of the components such as ISP 110 may be eliminated; furthermore, the ISP 110 may be integral to the end user unit 114, or it may include a web site server 102. Regardless of the configuration of the web site server 102, the server includes at least one web site having a web site topology.

II. Web Site Characteristics

A. Web Site Topology

A web site essentially comprises a set of pages. The pages are linked together allowing a visitor to move form one page to another page. This "linked" arrangement between pages constitutes a part of a web sites's topology. A set of pages can contain or point to a variety of resources, including images, audio, text, scripts (an interpretable program that can be executed in response to visitor actions), and "clickable" links to resources. Clickable refers to the ability of a web site visitor to traverse at least part of the web site by "clicking" on a designated location and being linked to a desired location or resource. For example, a clickable resource can result in the following effects:

the visitor traverses the site topology to another page;

the current page is modified in some manner;

background processing invisible to the visitor is executed (e.g., when the visitor clicks on an advertisement, a count is incremented in a database); or background processing visible to the visitor is executed (e.g., when a visitor clicks on a button on an Entry Form, that form may be submitted to a database, followed by the presentation of new page view to the visitor.)

The present invention concerns clickable resources. In one embodiment, a page comprises itself (a page is itself a resource) and may include printers to additional resources (images, text, etc.) including zero or more clickable links to other resources such as other pages, as well as buttons and other interactive controls which control access to data or scripts. Each clickable link invokes a resource, and when clicked, logs a "hit" on that resource in the web log. A hit indicates that a resource fitting the desired description has been found. A single click can result in hits to a number of resources, e.g., when a page is viewed, the resources associated with that page log hits in the database. The web site topology may be mapped as a connected graph that describes the pages, their clickable links and their clickable resource, as well as page content, for example, images, text, etc.

B. Visitors

A "visit"—also referred to in this application as a "session"—is a single user's sequence of requests, such as pages viewed, while at a web site. Visitors may pursue a site by entering it via several possible entry points and traversing the web site by clicking on clickable resources as discussed above.

C. Web Logs

Web visitation logs record the actions of every visitor to the web site, gathering historical data on who visits the site and what they do there. This includes reports such as the number of users per day and per hour, what times are most active, how much data is accessed from the site per time period and per visit, which pages are accessed most frequently, which files are downloaded most frequently, details on where users come from geographically, what browsers they use, and what computer platforms they own. If "referral logs" are enabled, it can also be recorded where the user originates within the internet domain space, indicating the previous URL that they viewed immediately prior to entering the current site. Once a user leaves the site, it can no longer be tracked in the web visitation logs for that site.

In addition to using these conventional summary statistics, the present invention applies data-driven statistical pattern discovery methods ("data mining") to sift through the data automatically in search of unusual or otherwise interesting patterns, such a regularities, irregularities, cooccurences, correlations, or trends.

III. Operation

In addition to the various hardware embodiments described above, a different aspect of the invention concerns a method for simulating web site traffic. A general online version of the present invention is shown in FIG. 1B and a general offline version is shown in FIG. 2.

Figure 1B:
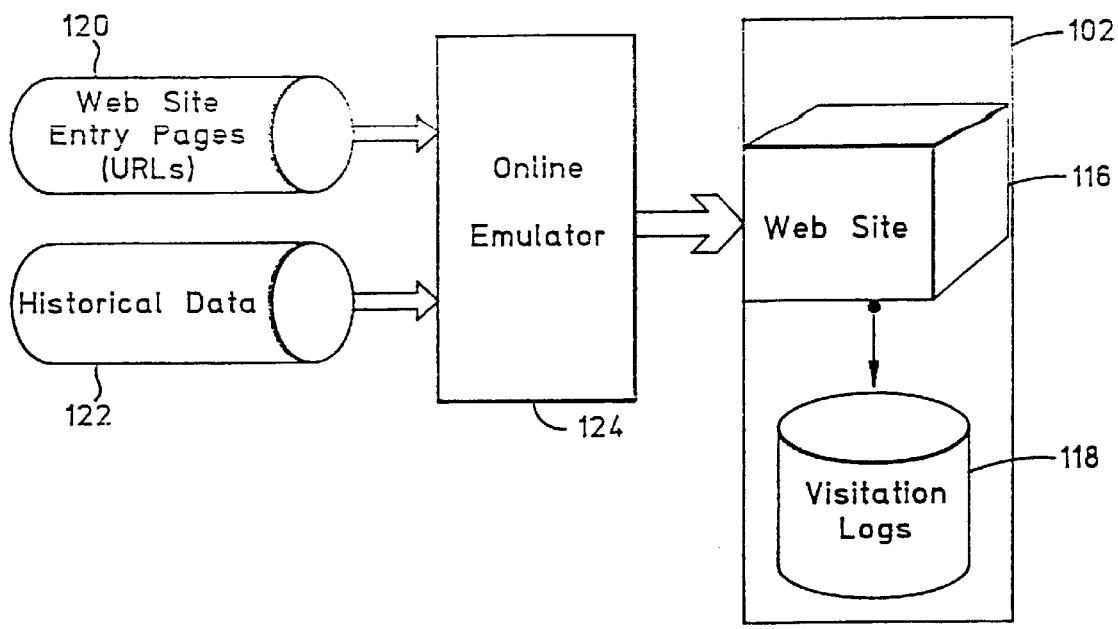
FIG. 1B is a block diagram for an online emulator of the hardware components and interconnections of a digital signal processing system used to emulate visitor traffic over a live web site in accordance with one embodiment of the present invention.

In FIG. 1B, an online emulator 124 considers real time data such as the available web site entry pages 120 and historical data 122 to determine the movement preferences for a web site visitor across a web site 116. Visitation logs 118 are created from each visitors traversal of the site and may be used in offline emulation as discussed below. Using this accumulated data, the present invention applies a method to determine the movement preferences.

Figure 2:
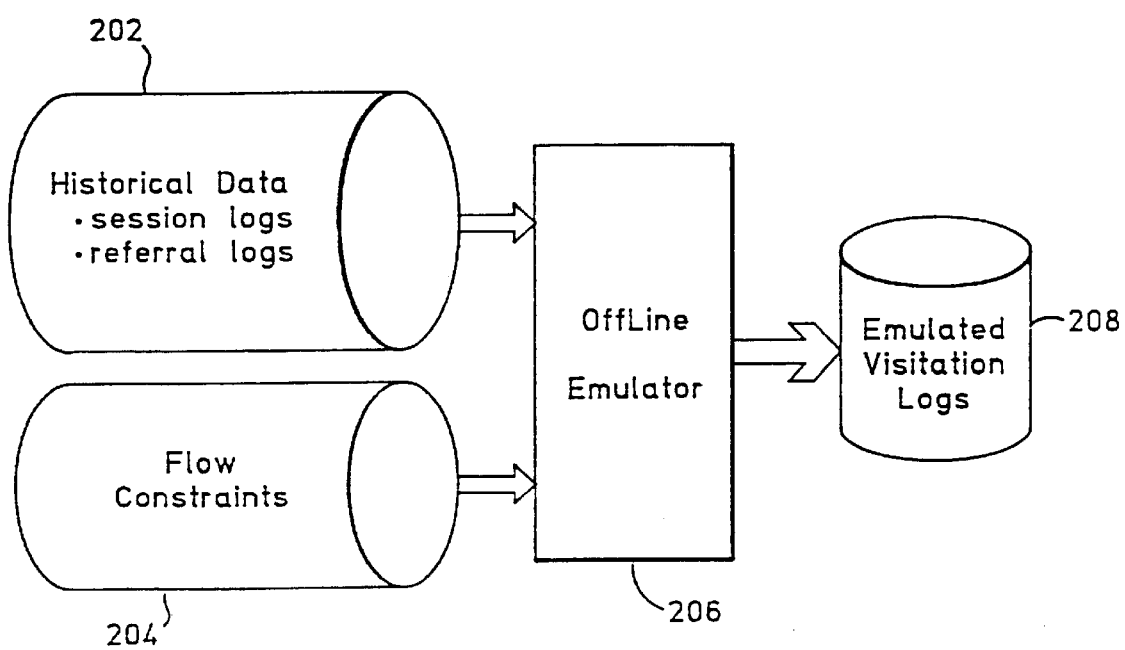
FIG. 2 is a block diagram for an offline emulator used to emulate visitor traffic over an offline web site in accordance with one embodiment of the present invention.

In FIG. 2, an offline emulator 206 uses historical data 202 such as session logs and referral logs to generate "emulated" visitation logs 208. These emulated logs 208 comprise preference profiles for hypothetical web site visitors and other relevant information. The hypothetical visitor's preferences are based upon an analysis of the historical data 202 and certain subjective preferences. Flow constraints 204 representing topology limitations inherent in a web site are also used by the offline emulator 206 to determine truly preferential selections from mandated selections. The offline emulator 206 generates these emulated visitation logs 208 using a method as described in detail below.

A. In General

Figure 3:
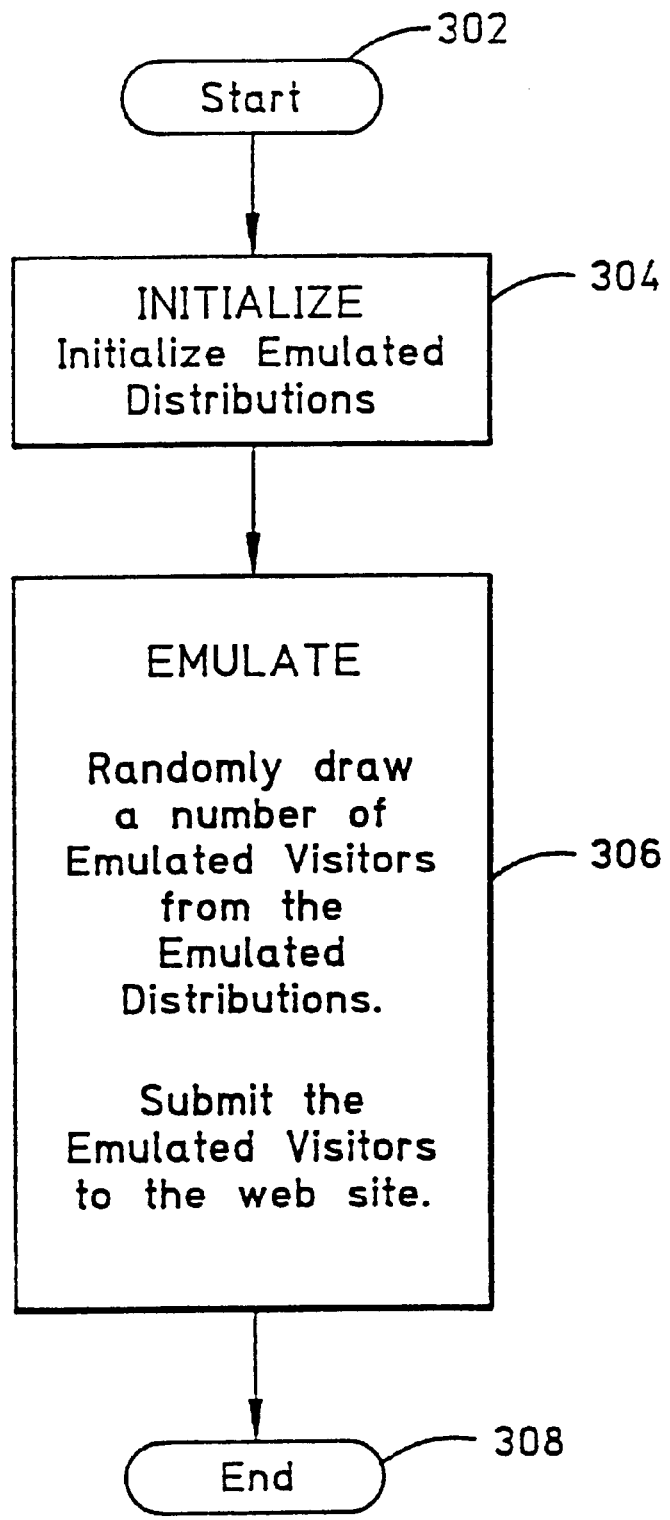
FIG. 3 is a flowchart of an operational sequence for simulating web site traffic and emulating visitor behavior in accordance with one embodiment of the present invention.

A descriptive overview of a single iteration of an emulated visit for a general embodiment of the present invention is shown in FIGS. 3–8. Referring to FIG. 3, the method starts in task 302 and a desired visitor behavior is specified during initialization in task 304 using a set of probability distributions. In one embodiment, these distributions are based upon data mined using the Association Rule Ranker for Web Site Emulation invention referenced above. In another embodiment, the distribution is based upon a program assembled to reflect the desires of the person studying the traffic patterns.

In either case, whenever a choice needs to be made (e.g., select an entry page, select a link, end the session) for an emulated visitor, the method makes a selection according to a set of distributions. Thereafter, the emulated visitor is passed through the site in task 306 where the emulated visitor enters the site at a particular page, and then traverses the site by making choices according to the probability distributions specified in the previous step. These two steps are repeated until sufficient coverage of the site is achieved and a stop is invoked in step 308, ending the method. An example of a stop might be to continue generating visits until all reachable pages on the site are visited "x" number of times.

Figure 4:
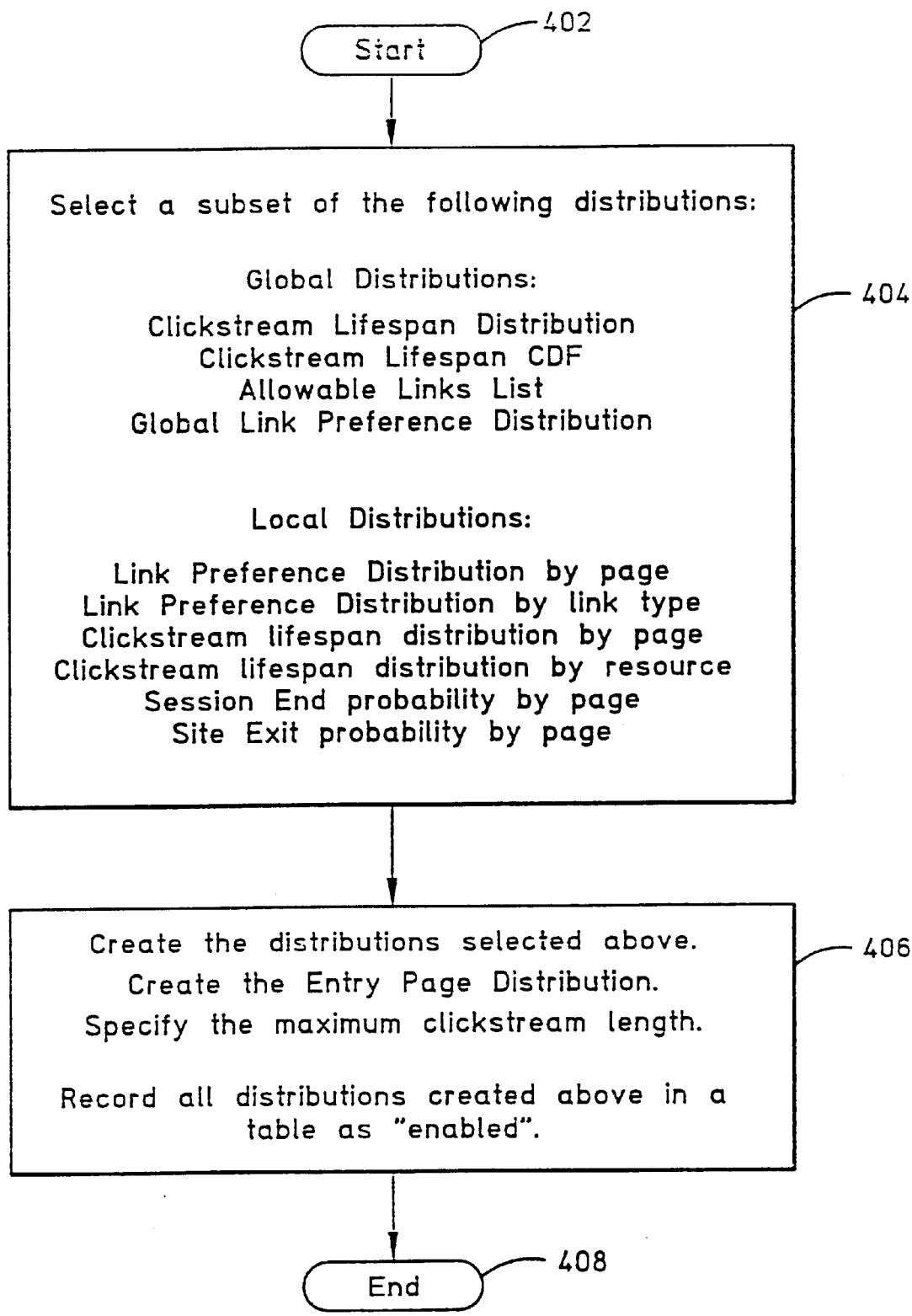
FIG. 4 is a flowchart of an operational sequence for an embodiment of task 304 of FIG. 3 for initializing the emulation in accordance with one embodiment of the present invention.

The initialization step 304 of FIG. 3 is shown in greater detail in FIG. 4 where initialization begins in task 402.

1. Specifying Visitor Behavior

Emulated behaviors may be described by rating distributions over a finite set of options. Designated behaviors may be specified according to some prior order to attain a certain effect, such as making all emulated visits enter the site at a particular page in order to evaluate how traffic flows from that page throughout the rest of the site. To make emulated visitors similar to a set of actual users observed in the past in some regard, such as typical session length as shown in task 404 of FIG. 4, certain conduct descriptors obtained over actual site visits may be used. These descriptions, can be used to regulate behavior ranging from general to specific. Examples of these types of behaviors are described below.

1.a. General Behavior (Aggregate Descriptions)

These descriptions describe the general emulated behavior of visitors overall. Typical examples shown in task 404 include, but are not limited to:

Entry page distribution: a visitor's entry page is the first page they view. In general, an entry page can be any page that can be accessed directly by visitors from outside the site. The entry page distribution describes how the entry pages selected by visitors distribute over the set of all possible entry pages at the web site;

Exit page distribution: a visitor's exit page is the last page they view before leaving the site. This distribution describes how exit pages distribute over the web site's viewable pages; and Clickstream lifespan distribution that gives a distribution over the number of clicks generated by visitors during the average session.

Although numerous general behaviors can be emulated using the present invention, not all behavior is useful. For example, one particular general behavior distribution that is not very helpful for emulating actual visitors, but that is very useful for generating hypothetical emulated visitors, is the "rank ordered link selection distribution." This gives the distribution of link selections made by visitors over an ordered set of candidate links. A general example of this is the uniform distribution—corresponding to visitors which, given a set of candidate links from which they must choose, are equally likely to click on any given one. Another example of this is a distribution that weights link preference according to their position in rank ordered list. A tangible example of this type of distribution is advertisement positioning. Based upon the positioning, visitors are more likely to click on advertisements placed near the top of the page than on advertisements placed lower on the page.

The computation of this type of distribution from empirical data is straightforward. For example, to compute the entry page distribution over a given set of sessions:

Identify the set of entry pages having at least one entry over the given set of sessions;

Given the set of entry pages identified above, count the number of sessions for which each served as an entry page; and Normalize each count by the number of entry pages.

As another example, to compute the clickstream lifespan distribution over a given set of sessions:

Identify the set of entry pages having at least one entry over the given set of sessions;

Given the set of entry pages identified above, count the number of sessions for which each served as an entry page; and Normalize each count by the number of entry pages.

1.b. Specific Behavior (Conditional Descriptions)

Some of the aggregate descriptions listed above can be refined to describe visitor behavior to a "click-by-click"

resolution as also shown in task 404 of FIG. 4. For example, visitor behavior may be specified to depend upon a recent event in the visitor's session, for example, having viewed a particular page. Examples of such conditional descriptions, include but are not limited to:

Link selection distribution (by page), where the distribution of actual clicks over the set of clickable links on a particular page, averaged over all visits to that page, are determined;

Clickstream lifespan distribution (by page), where the remaining clickstream lifespan distribution for visitors on a particular page are determined. For example, visitors to a financial services web site might typically leave shortly after viewing their account balances, whereas visitors to the login page will tend to have a relatively much higher remaining clickstream lifespan;

Clickstream lifespan distribution (by resource), where the distribution of the remaining clickstream lifespan of a visitor that has just accessed a particular resource is measured. For example, most visitors to a financial services web site might leave shortly after placing a trade—thereby launching a script that executes a transaction against their account—whereas most visitors that have just logged on—thereby executing a login script—typically have relatively higher clickstream lifespans remaining;

Session end probability (by page), where the conditional probability that a visitor to a particular page will end the session immediately thereafter is determined;

Site exit probability (by page), where the conditional probability that a visitor to a particular page will exit the site immediately thereafter is determined; and Resource-dependent link selection distribution, where the propensity of the average visitor to click on a particular category of resource out of several candidate categories is measured, for example, whether visitors tend to be more likely to click on a internal link than an advertisement.

1.c. User-Segment Specific Behavior

Any of the descriptions mentioned above can also be determined for a particular segment (subset) of a set of actual visitors. For example, the link selection distribution may be consistent with that of actual visitors overall on every page except for one, where it is instead consistent with the link selections observed for a particular segment of actual visitors. This allows the present invention to measure hypothetical situations such as "what if every visitor to this particular page acted in the same way as this particular segment of visitors?"

After a distribution has been selected and initialized, the respective distribution is created in task 406. Likewise, an Entry page distribution is created and, if desired, a maximum clickstream length may be specified. Any distribution created in task 406 is recorded for use during the emulation process, such as that shown in FIG. 5A. The initialization ends in task 408 after desired distributions have been created.

1.d. Emulate

Figure 5B:
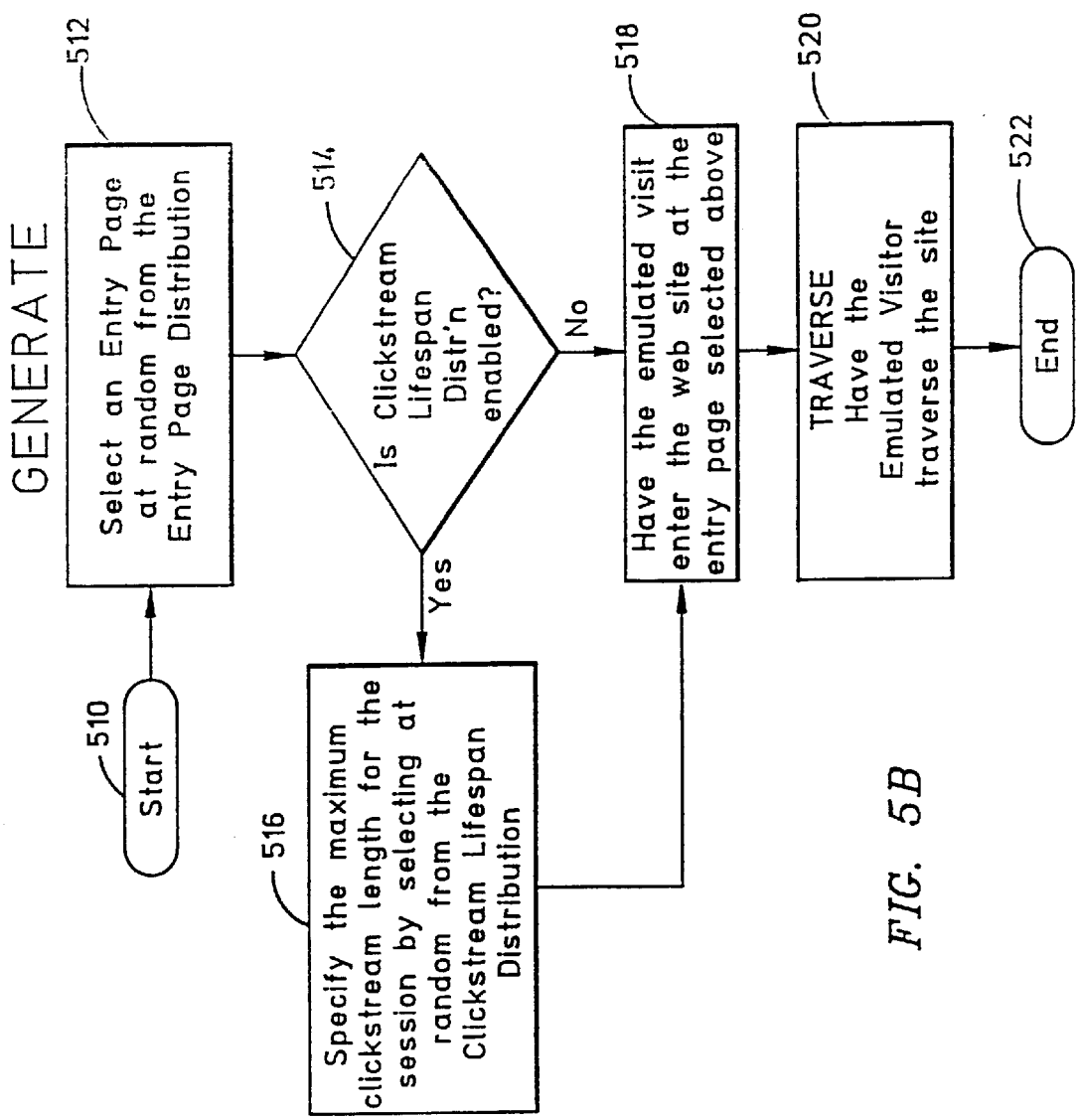
FIG. 5B is a flowchart of an operational sequence for an embodiment of task 504 shown in FIG. 5A for generating an emulated visit in accordance with one embodiment of the present invention.
Figure 5A:
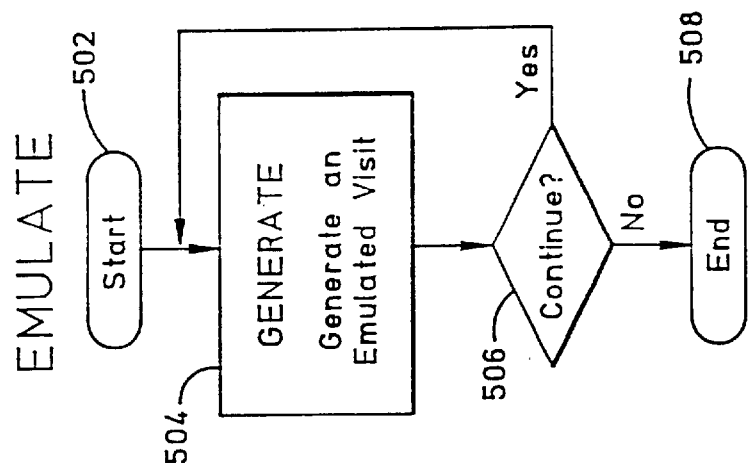
FIG. 5A is a flowchart of the operational sequence for an embodiment of task 306 of FIG. 3 for carrying out the emulation process in accordance with one embodiment of the present invention.

The emulation task 306 of FIG. 3 is shown in greater detail in FIG. 5A and starts in task 502. An emulated visit—discussed in greater detail in FIG. 5B—is generated using the randomly drawn emulated visitors from the emulated distributions. Each selected emulated visitor is submitted to the web site in task 504 and the method continues in task 506 until all emulated visitors have been passed through the site. The emulation method ends in task 408.

The generation of an emulated visit as shown generally in task 504 is shown in greater detail in FIG. 5B. Generation begins in task 510 and an entry page is chosen at random in task 512 from the entry page distribution. The entry page is used to determine where the emulated visitor has entered a site. If the clickstream lifespan is enabled in task 514, a maximum clickstream length for the emulated visit is selected in task 516. In one embodiment, the length is selected at random from a clickstream lifespan distribution. In another embodiment, the length is chosen as desired by the user studying the site. This clickstream lifespan may be used to limited the total "clicks" to be exercised in traversing a site when using one version of the invention.

Regardless of whether or not a clickstream lifespan is used, the emulated visitor enters the site at the selected entry page in task 518. The visitor traverses the site in task 520—traversing being shown in greater detail in FIG. 6 starting with task 602—and the generation of the emulated visit ends in task 522.

Figure 6:
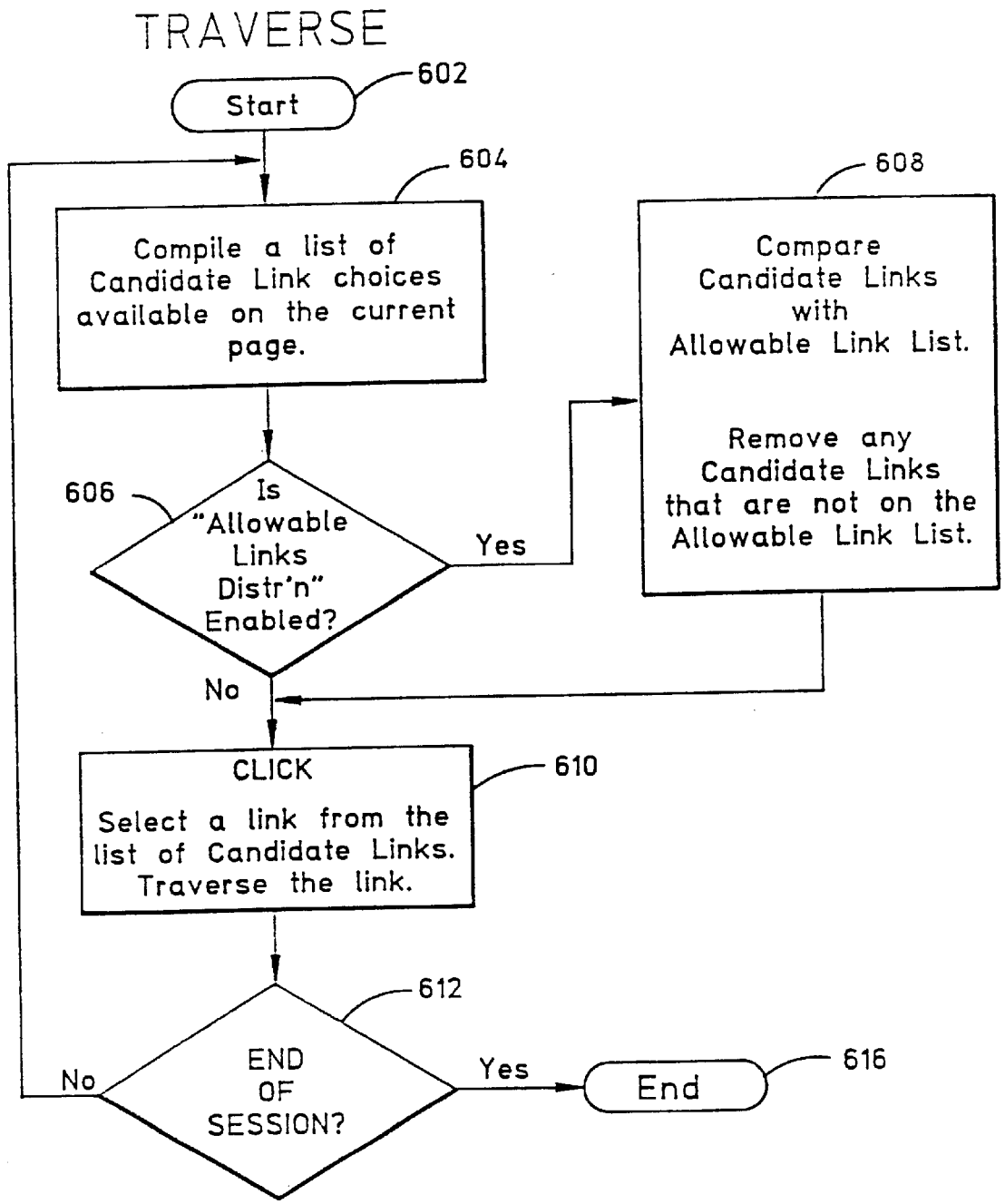
FIG. 6 is a flowchart of an operational sequence for an embodiment of task 520 FIG. 5B for an emulated visitors' traversal of a web site in accordance with one embodiment of the present invention.

In FIG. 6, traversing comprises compiling a list of links available on the current web page, referred to as candidate links, in task 604. These links may be restricted in availability by having the allowable links distribution enabled as shown in task 606. If this distribution is enabled, then the available candidate links are compared with the allowable links in task 608. Any candidate link that is not also an allowable link is removed from further consideration. At random, an available link is selected and the link is traversed in task 610. If further available links remain to be traversed in task 612, then the traversal of FIG. 6 is repeated for each available link until the session ends in task 616 and as discussed below with respect to FIG. 8.

Figure 7:
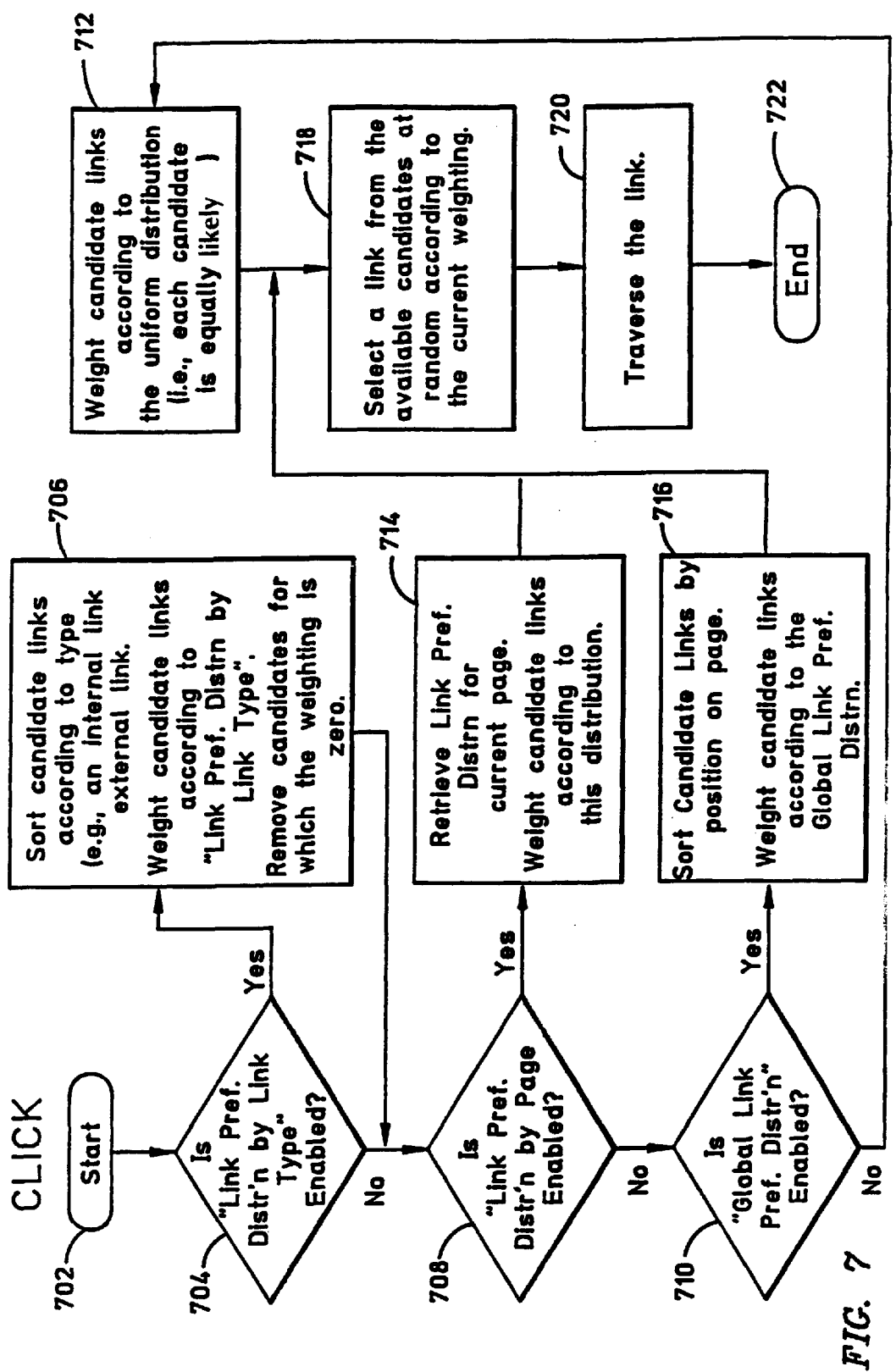
FIG. 7 is a flowchart of the operational sequence for an embodiment of task 610 of FIG. 6 for clicking on a link and traversing the link in accordance with one embodiment of the present invention.

Selection of a link or CLICK as shown in task 610 of FIG. 6 is shown in greater detail in FIG. 7. CLICK begins at task 702 and it is determined whether or not link preference distribution by link type has been enabled in task 704. If it has not been enabled, the method continues with task 708. Otherwise, available links—also referred to as candidate links—are separated, for example, by internal links and external links in task 706. A weight may be assigned to each candidate depending upon the distribution, where, for example, a weight might refer to preferring one link over another link. In another embodiment, the weights may be determined using the data mining association rules referenced herein. Any candidates having a predetermined weight, or within a preassigned weight range, is removed from the available candidate links.

In task 708, if link preference distribution by page is not enabled, then the method continues in task 710. If the "by-page" distribution is enabled, a link preference distribution for the current page is retrieved. If not found, such distribution may be generated. Similarly to the sorting discussed with respect to weighing in task 706, candidate links are sorted and weighted according to this link preference distribution in task 714. The method continues in task 718.

However, in task 710, if global link preference distribution is enabled, candidate links are sorted based upon their respective positioning on the page. A global link preference distribution is retrieved, and the candidates are weighted according to this distribution. The method continues in task 718. But if the global link distribution was not enabled, candidate links are weighted in task 712 according to a uniform distribution selected by the person studying the web site, for example, where each candidate is equally likely. In another embodiment, the distribution may be generated based upon predetermined criteria.

Regardless of whether one, some, all or none of the distributions of tasks 708, 710, and 712 are enabled, an available link is selected at random in task 718 according to their respective weighing. The link is then traversed in task 720 and CLICK ends in task 722.

Figure 8:
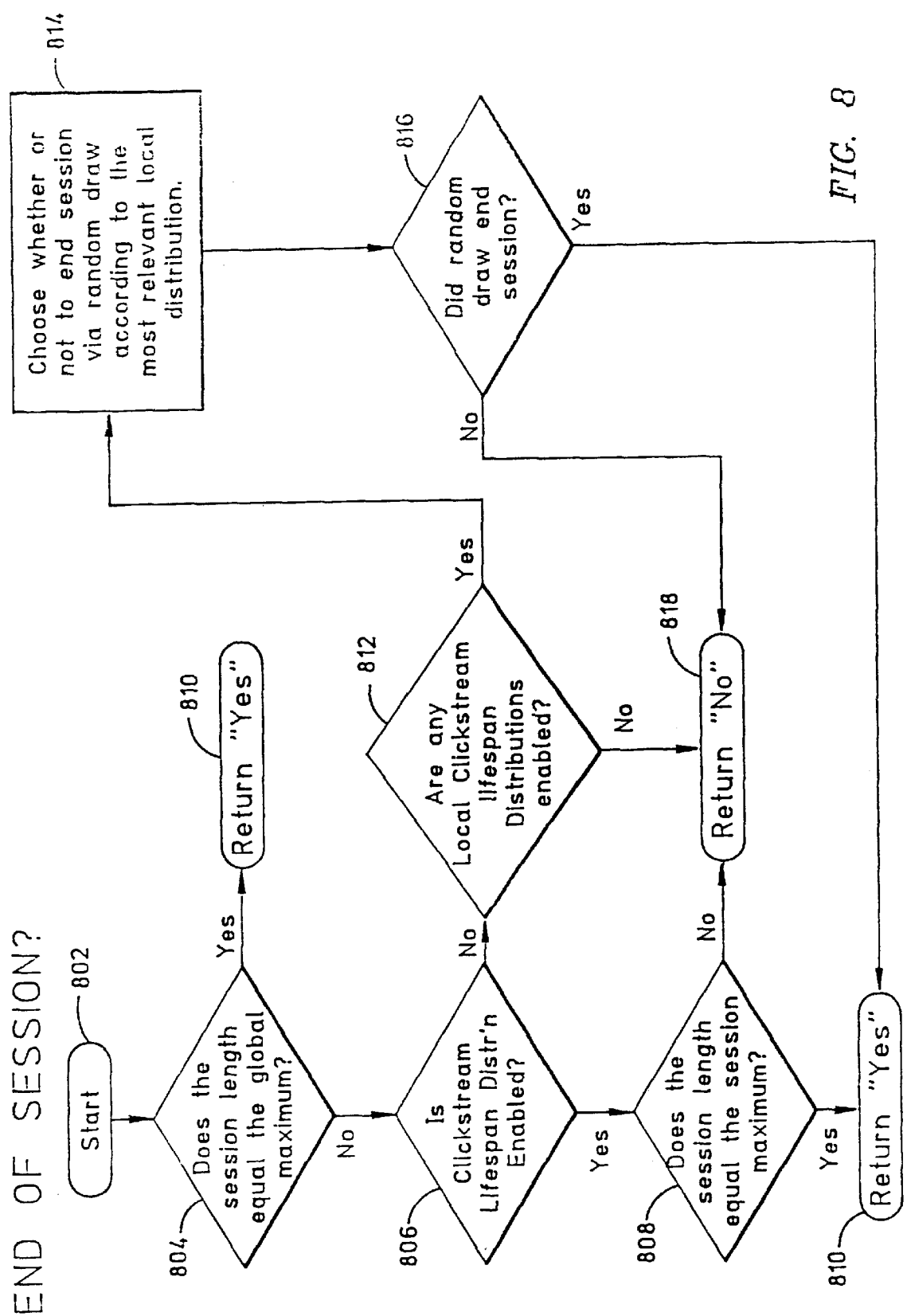
FIG. 8 is a flowchart of the operational sequence for an embodiment of task 612 of FIG. 6 for ending of an emulated session in accordance with one embodiment of the present invention.

FIG. 8 shows one method for determining if the end of a session has been reached in task 612 of FIG. 6. If the session length equals the global maximum, the session ends in task 810. Global maximum refers to, in one embodiment, to running out of links to click. It may also refer to other global limitations, such as relating to time or space. If the session length does not equal the global maximum, and if clickstream lifespan distribution is not enabled in task 806, and if local clickstream lifespan distributions are enabled in task 812, a choice is made whether to end the session via a random draw based upon the most relevant local distribution in task 814 or to continue with the session. The most relevant distribution may be any local distribution for the page being studied, or for the site being studied. If the secession ends in task 816, the session is over in task 810. Otherwise, the session continues in task 818.

If no local clickstream lifespan distribution is enabled in task 812, the session also continues in task 818. Similarly, if the session length does not equal the session maximum length, the session continues in task 818.

To assist in further understanding the present invention, additional discussion follows interlaced with various examples comprising possible applications for the invention.

2. Simulating Actual Visitor Behavior

The present invention uses a set of behavioral statistics to simulate visitor behavior, generating "visitors" that exhibit traffic flow descriptions consistent with those caused by actual visitors that traverse a site. The descriptions (distributions) discussed above with respect to FIG. 4 are only some of the most generally applicable. Additions to these examples may lend even more realism to the emulation process that could be customized to the characteristics of a particular web site topology or customized to the characteristics of a particular set of known visitors. These additional examples are selected by the user of the present invention as required for creating a desired simulated behavior.

3. Emulating Hypothetical Visitors

Further, using the present invention, traffic flow statistics can be obtained for hypothetical visitors that have never been encountered in actual site traffic by specifying the emulated distributions to be applied to a web site. For example, if a user of the invention wants to set the entry page distribution range from "lifelike" to "hypothetical," the user could choose to:

i. Select randomly according to the empirical distribution obtained over a set of actual visitors;

ii. Select randomly according to a uniform distribution over a finite set of entry pages; or iii. Set to a particular single entry page which has never before served as an entry page for actual visitors.

If the user wanted to regulate the emulated visitors' clickstream lifespan, the user could choose to:

iv. At the "birth" of an emulated visitor, choose a number at random according to the empirical clickstream lifespan distribution obtained over a set of actual users, and leave this number fixed through the session. When the emulated visitor's session length equals this number, the session would end.

v. For every possible exit page, specify the probability that the emulated visitor exits at that page. When the emulated visitor encounters a candidate exit page, end the session according to the probability associated with that page;

vi. For every possible (exit page, clickstream length) pair, specify the probability that an emulated visitor entering that page and having a particular clickstream length will exit at that page. When the emulated visitor encounters a candidate exit page having a particular clickstream length, end the session according to the probability associated with that (exit page, clickstream length) pair; or vii. Specify the emulated visitors' clickstream lifespan cumulative distribution function (CDF) over the set of allowable clickstream lengths, given that at each clickstream length there is the probability that the session will end. At each click, end the session probabilistically according to this CDF.

4. The General Version

As mentioned above, FIGS. 3–8 show a sequence of method steps illustrating the method aspects of the present invention. Readers familiar with the general methodology associated with "monte carlo" simulations, random walk simulations, stochastic dynamical simulations, or generative models of probabilistic processes will readily understand the following detailed descriptions. And for further ease of explanation, but without any limitation intended thereby, the examples of FIGS. 3–8 are described in the context of the internet system 100 described above.

In many applications (e.g., statistical physics, molecular modeling, physical control systems, operations research) estimating the state probability distributions and state transition probabilities of a probabilitic process is desirable. The process may be well known at some level, yet despite this it may be difficult or impossible to compute such measurements analytically due to the complexity of the graph describing the system. Fortunately, numerical methods may be used to model such systems. A web site is such a system. Further, many web sites cannot be described by a static connectivity graph because of their dynamic construction.

Monte Carlo methods—methods used to obtain an approximate solution to a numerical problem by the use of random numbers—may be used for investigating the behavior of complex, nonlinear, and even dynamic stochastic systems like a dynamic web site. In the present invention, emulated visitors as defined in a problem start by making decisions much like their real-life counterparts, that is, the method of the invention selects each decision for an emulated visitor based upon the distributions discussed above. Decisions on actions to take are based either on probabilities computed from actual web site traffic data, on results of learning models, or on subjective expectations gleaned from observational experience. These decisions include selecting which page to use to enter a site, which hyperlinks to select in traversing the site, whether or not to wholly ignore certain classes of hyperlinks—such as help and support links—and when to end the visitation session, either by stopping at a certain location or by exiting the site.

These probabilities can be drawn from aggregate statistics averaged over the entire site, local statistics conditioned on a particular page, resources or other specific location within the site topology, or on "markov" probabilities computed over sequences or chains within the site topology structure. One such method comprising one embodiment of the present invention represented in pseudo code follows:

1. Parameterize Entry Page Distribution;

2. Parameterize visitation stopping rules to avoid endless or lengthy loops.

to regulate visitation lifespan;

3. Parameterize topology traversal decision rules e.g., pagewise like preference Distribution; and 4. Parameterize simulation stopping rules e.g., detect when sufficient coverage of the site has been attained.

e.g., detect when sufficiently man visits have been generated.

```
//--------------------------
//    Generate emulated visitors,
//    Submit each visitor to the site,
//    And repeat,
//    Until a stopping rule is satisfied.
//--------------------------
```

5. While (simulation stopping rule indicates more processing is necessary)

```
{       5a.  Choose an entry page
        5b.  Submit an emulated visit to the entry page
        5c.  While (visitation stopping rules indicate that emulated visit
             can continue)
             {
                     Assemble a list of available clickable items.
                     Identify a subset of this list as condidate click
                     options.
                     Weight each candidate click option according to a
                     probability distribution.
                     Select a candidate click option at random according
                     to this distribution.
                     "Hit" the resource identified by the selected click
                     option.
                     //-----------
                     // COMMENTARY:
                     // At this point the web log will record a hit on this
                     // resource, as well as on any other resources that are
                     // hit as a side effect.
                     // This hit may result in a new page view,
                     // or, it may take the emulated visit offsite, thereby
                     // ending the session.
                     // If the click selection takes the emulated visit off-
                     // site, exit this while loop.
             }//     end of visitation while loop
} // end of simulation while loop.
```

This embodiment of one method of the present invention is a general purpose implementation that may be applied, for example, to a live production site. Therefore, emulated visits can experience exactly the same conditions presented to actual visitors. The method is also probabilistically "accurate" to an arbitrary degree of precision, meaning that the behavior of actual visitors can be generated to any degree of realism by increasing the complexity of the simulation.

The general method may be applied to a replicated version of a web site, resulting in a simulation that does not intrude on the live production site. Other benefits of the general method are that emulated traffic experiences "live" web conditions, and that all links available to actual visitors are accessible to emulated visitors.

Further the general method has general applicability: historical logs for reconstructing the site topology are not required (e.g., referral logs), traffic analysis can begin immediately; and, the accuracy of the method does not depend upon the quantity and quality of historical data.

The next section presents another embodiment of the present invention for a specific implementation specially suited to offline simulation. This method exploits some of the special characteristics of the offline situation and also employs some approximations of the probability distributions employed by the general method.

B. Deterministic Version

A web site can be simulated offline given sufficient types and amounts of historical information drawn from actual visitations. The type of historical information required may include sessionized web logs (activity logs parsed into sessions) or referral logs (identifying for each visitor's activity the immediately prior activity for that visitor). Referral logs are used to allow the deterministic version of the method to reconstruct the topology that is traversed by a particular session. Further, the deterministic version includes additional benefits over the general purpose "live" version: the deterministic version is less intrusive because no traffic is sent to an active site; the "emulated" web site is fully controllable and can be manipulated at will whereas the "live" web site, in general, cannot; and, the emulated site allows computational shortcuts to be applied to make a site more efficient when it is placed on line.

One benefit of the offline version is computational efficiency. For example, the "monte carlo" nature of the general method is sacrificed in exchange for a method that is deterministic yet which approximates the probability distributions employed in the general version. Rather than drawing the parameters for an emulated visit at random from a probability distribution, a parameter for the emulated visit is specified exactly by drawing it from an empirical sample. Another major approximation is obtained by utilizing a very simple stopping rule for determining when to end the simulation. Finally, the web site itself is not active during the simulation; instead, traversal of its topology is emulated by traversing records in a database.

Below are the method steps for one embodiment of the deterministic version of the present invention, given the session logs for a set of visits.

Step 1. Initialize

1A. Rank order the sessions in the given session logs.

1B. Set m to some finite constant integer.

Step 2. For each session ("actual visit") in the given session logs:

2A. Create an emulated visit:
   initialize the entry page to that of the actual visit.
   initialize the maximum clickstream lifespan to the lifespan of the actual visit.

2B. Pass the emulated visit through the web site.
   all other actions emulated during the visit are determined probabilistically as in the General Method.

Step 3. Repeat Step 2 m times.

If the actual visits number 111,000 then setting m=5 will result in 555,000 emulated visits. Because random choice can be exhibited during an emulated session (only the entry point and clickstream lifespan are determined explicitly from an actual session) multiple emulated session determined by an actual session can exhibit much different behavior. For example, the specification of the Link Choice Distribution can be accomplished in several ways, just as in the general method.

In one embodiment, the Link Choice Distribution may be based upon an equal likelihood determination, where, given a set of link options from which to choose, any particular option with equal likelihood is selected. This is equivalent to applying a uniform distribution to the set of choices, then clicking on a link according to this (uniform) distribution.

In another embodiment, the Link Choice Distribution may be based upon a modified equal likelihood determination where a uniform distribution used to accomplish an equal likelihood link preference is replaced with another discrete distribution. For example, some subset of links may be assigned a 0 probability, and a uniform distribution applied to the remaining links. Or, it could be replaced by an empirical distribution determined by actual users.

Other embodiments of the methods described above and their functionality are attainable by taking hybrids of the Deterministic and General versions. For example, the Deterministic version can be enhanced to allow any degree of realism just as in the General version, including the entry page and clickstream lifespan. Additional embodiments can be readily developed by those schooled in the art based upon the above discussion and in light of the specification read as a whole.

IV. Signal-Bearing Media

In the context of FIGS. 1–2, such a method may be implemented, for example, by operating the internet system 100, as embodied by a digital data processing apparatus first system 101, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to generate visitor traffic over a web site.

Figure 9:
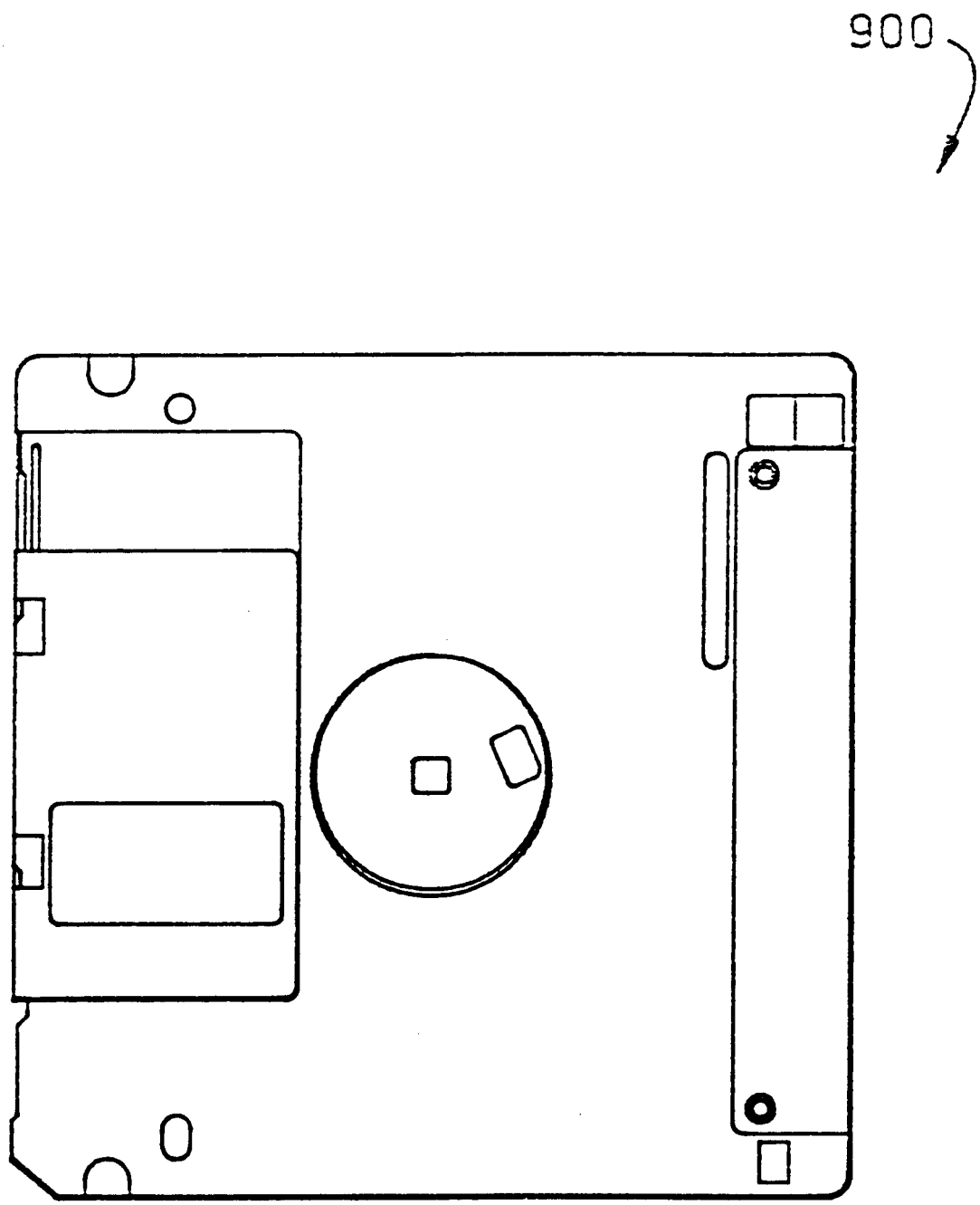
FIG. 9 is an exemplary embodiment of a signal bearing medium in accordance with the invention.

This signal-bearing media may comprise, for example, RAM (not shown) contained within the web server 102. Alternatively, the instructions may be contained in another signal-bearing media, such as a magnetic data storage diskette 900 (FIG. 9), directly or indirectly accessible by the web server 102 or the ISP 110. Whether contained in the web server 102 or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as C, $C^+$, $C^{++}$, etc.

V. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for emulating behavior of web site visitors for producing web site trend analysis data, the method comprising:

initializing an emulated distribution, the emulated distribution having data reflecting decisions made by visitors during a traversal of a web site and selecting a subset of a distribution to be emulated;

creating an emulated distribution including an entry page distribution, the emulated distribution emulating distribution and transition probabilities for selected actions of an emulated visitor;

specifying a maximum clickstream length;

storing the emulated distributions;

randomly selecting a number of visitors from the emulated distribution;

traversing a web site using the randomly selected emulated visitors; and ending the emulation session.

2. A method for emulating behavior of web site visitors for producing web site trend analysis data, the method comprising:

initializing an emulated distribution, the emulated distribution having data reflecting decisions made by visitors during a traversal of a web site;

said emulated traversal of the web site by a visitor comprising:

selecting at random an entry page from an entry page distribution;

specifying a maximum clickstream length by randomly selecting a clickstream length from a clickstream lifespan distribution if the clickstream lifespan distribution is enabled;

entering the web site at the selected entry page; and traversing the web site; and randomly selecting a number of visitors from the emulated distribution; traversing a web site using the randomly selected emulated visitors; and ending the emulation session.

3. The method recited in claim 2, traversing the web site comprising:

generating a list of candidate links, a candidate link being a link choice available to a visitor on a page of the web site;

selecting a candidate link from the list; and traversing the candidate link.

4. The method recited in claim 3, the method further comprising selecting only candidate links that are allowable links.

5. The method recited in claim 4, traversing a candidate link comprising:

enabling link type preference distribution;

sorting candidate links by type;

weighing each candidate link using link preference distribution by link type, and ignoring any candidate link with a specified weight;

weighing candidate links by a uniform distribution where each candidate is equally as likely;

selecting allowable candidate links from the weighed candidate links; and selecting at random an allowable candidate link from the allowable weighed candidate links.

6. A method for emulating behavior of web site visitors for producing trend analysis data, the method comprising:

initializing an emulated distribution, the emulated distribution having data reflecting decisions made by visitors during a traversal of a web site;

randomly selecting a number of visitors from the emulated distribution;

traversing a web site using the randomly selected emulated visitors; the emulated traversal of the web site by a visitor comprising:

selecting at random an entry page from an entry page distribution;

specifying a maximum clickstream length by randomly selecting a clickstream length from a clickstream lifespan distribution if the clickstream lifespan distribution is enabled;

entering the web site at the selected entry page;
traversing the web site comprising generating a list of candidate links, a candidate link being a link choice available to a visitor on a page of the web site;
selecting a candidate link from the list;
traversing the candidate link selecting only candidate links that are allowable links by enabling page preference distribution;
retrieving a link preference distribution for a current page;
weighing each candidate link using link preference distribution for the current page, and ignoring any candidate link with a specified weight; and
selecting at random an allowable candidate link from the allowable weighted candidate links; and
ending the emulation session.

7. The method recited in claim 4, traversing a candidate link comprising:
enabling global link preference distribution;
sorting candidate links by position on a page;
weighing each candidate link using the global link preference distribution; and
selecting at random an allowable candidate link from the allowable weighted candidate links.

8. The method recited in claim 4, traversing a candidate link comprising:
if link type preference distribution is enabled, then:
sorting candidate links by type;
weighing each candidate link using link preference distribution by link type, and ignoring any candidate link with a specified weight;
weighing candidate links by a uniform distribution where each candidate is equally as likely;
selecting allowable candidate links from the weighed candidate links; and
selecting at random an allowable candidate link from the allowable weighed candidate links;
if page preference distribution is enabled, then:
retrieving a link preference distribution for a current page is selected, then:
weighing each candidate link using link preference distribution for the current page, and ignoring any candidate link with a specified weight; and
selecting at random an allowable candidate link from the allowable weighted candidate links;
if global link preference distribution is enabled, then:
sorting candidate links by position on a page;
weighing each candidate link using the global link preference distribution; and
selecting at random an allowable candidate link from the allowable weighted candidate links.

9. The method recited in claim 5, ending the emulation session comprising:
ending the emulation session if all allowable weighted link candidates have been traversed.

10. The method recited in claim 6 ending the emulation session comprising:
if the clickstream lifespan distribution is enabled, ending the emulation session;
otherwise, if a local clickstream lifespan distribution is enabled, choosing randomly whether or not to end the emulation session based upon a most relevant local distribution.

11. The method recited in claim 7, ending the emulation session comprising:
if an emulation session length has reached the global maximum, ending the session.

12. The method recited in claim 8, ending the emulation session comprising:
if a link preference distribution by link type is enabled, ending the emulation session if all allowable weighted link candidates have been traversed;
if the clickstream lifespan distribution is enabled, ending the emulation session;
if a local clickstream lifespan distribution is enabled, choosing randomly whether or not to end the emulation session based upon a most relevant local distribution; and
if an emulation session length has reached the global maximum, ending the session.

13. The method of claim 1, the emulated traversal of a web site by a visitor comprising:
selecting at random an entry page from an entry page distribution;
specifying a maximum clickstream length by randomly selecting a clickstream length from a clickstream lifespan distribution if the clickstream lifespan distribution is enabled;
entering the web site at the selected entry page; and
traversing the web site.

14. The method recited in claim 13, traversing a web site comprising:
generating a list of candidate links, where a candidate link is a link choice available on a page of the web site;
selecting a candidate link from the list; and
traversing the candidate link.

15. The method recited in claim 14, the method further comprising selecting only candidate links that are allowable links.

16. The method recited in claim 15, traversing a candidate link comprising:
enabling link type preference distribution;
sorting candidate links by type;
weighing each candidate link using link preference distribution by link type, and ignoring any candidate link with a specified weight;
weighing candidate links by a uniform distribution where each candidate is equally as likely;
selecting allowable candidate links from the weighed candidate links; and
selecting at random an allowable candidate link from the allowable weighed candidate links.

17. The method recited in claim 15, traversing a candidate link comprising:
enabling page preference distribution;
retrieving a link preference distribution for a current page;
weighing each candidate link using link preference distribution for the current page, and ignoring any candidate link with a specified weight; and
selecting at random an allowable candidate link from the allowable weighted candidate links.

18. The method recited in claim 15, traversing a candidate link comprising:
enabling global link preference distribution;
sorting candidate links by position on a page;
weighing each candidate link using the global link preference distribution; and
selecting at random an allowable candidate link from the allowable weighted candidate links.

19. The method recited in claim 15, traversing a candidate link comprising:
   if link type preference distribution is enabled, then:
      sorting candidate links by type;
      weighing each candidate link using link preference distribution by link type, and ignoring any candidate link with a specified weight;
      weighing candidate links by a uniform distribution where each candidate is equally as likely;
      selecting allowable candidate links from the weighed candidate links; and
      selecting at random an allowable candidate link from the allowable weighed candidate links;
   if page preference distribution is enabled, then:
      retrieving a link preference distribution for a current page is selected, then:
      weighing each candidate link using link preference distribution for the current page, and ignoring any candidate link with a specified weight; and
      selecting at random an allowable candidate link from the allowable weighted candidate links;
   if global link preference distribution is enabled, then:
      sorting candidate links by position on a page;
      weighing each candidate link using the global link preference distribution; and
      selecting at random an allowable candidate link from the allowable weighted candidate links.

20. The method recited in claim 16, ending the emulation session comprising:
   ending the emulation session if all allowable weighted link candidates have been traversed.

21. The method recited in claim 17, ending the emulation session comprising:
   if the clickstream lifespan distribution is enabled, ending the emulation session;
   otherwise, if a local clickstream lifespan distribution is enabled, choosing randomly whether or not to end the emulation session based upon a most relevant local distribution.

22. The method recited in claim 18, ending the emulation session comprising:
   if an emulation session length has reached the global maximum, ending the session.

23. The method recited in claim 19, ending the emulation session comprising:
   if a link preference distribution by link type is enabled, ending the emulation session if all allowable weighted link candidates have been traversed;
   if the clickstream lifespan distribution is enabled, ending the emulation session;
   if a local clickstream lifespan distribution is enabled, choosing randomly whether or not to end the emulation session based upon a most relevant local distribution; and
   if an emulation session length has reached the global maximum, ending the session.

24. A signal-bearing medium tangibly embodying a program of machine-readable instructions executable by a digital processing apparatus to perform a method for emulating behavior of a web site visitor for producing web site trend analysis data, the method comprising:
   initializing an emulated distribution, the emulated distribution having data reflecting decisions made by visitors during an emulated traversal of a web site and selecting a subset of a distribution to be emulated;
   creating an emulated distribution including an entry page distribution, the emulated distribution emulating distribution and transition probabilities for selected actions of an emulated visitor;
   specifying a maximum clickstream length; and
   storing the emulated distribution;
   randomly selecting a number of emulated visitors from the emulated distribution;
   traversing the web site using the randomly selected emulated visitors; and
   ending the emulation session.

25. A signal-bearing medium tangibly embodying a program of machine-readable instructions executable by a digital processing apparatus to perform a method for emulating behavior of a web site visitor for producing web site trend analysis data, the method comprising:
   initializing an emulated distribution, the emulated distribution having data reflecting decisions made by visitors during an emulated traversal of a web site;
   said emulated traversal of the web site by a visitor comprising:
      selecting at random an entry page from an entry page distribution;
      specifying a maximum clickstream length by randomly selecting a clickstream length from a clickstream lifespan distribution if the clickstream lifespan distribution is enabled;
      entering the web site at the selected entry page; and
      traversing the web site;
   randomly selecting a number of emulated visitors from the emulated distribution;
   traversing the web site using the randomly selected emulated visitors; and
   ending the emulation session.

26. The medium recited in claim 25, traversing the web site comprising:
   generating a list of candidate links, a candidate link being a link choice available to a visitor on a page of the web site;
   selecting a candidate link from the list; and
   traversing the candidate link.

27. The medium recited in claim 26, the method further comprising selecting only candidate links that are allowable links.

28. The medium recited in claim 27, traversing a candidate link comprising:
   enabling link type preference distribution;
   sorting candidate links by type;
   weighing each candidate link using link preference distribution by link type, and ignoring any candidate link with a specified weight;
   weighing candidate links by a uniform distribution where each candidate is equally as likely;
   selecting allowable candidate links from the weighed candidate links; and
   selecting at random an allowable candidate link from the allowable weighed candidate links.

29. A signal-bearing medium tangibly embodying a program of machine-readable instructions executable by a digital processing apparatus to perform a method for emulating behavior of a web site visitor for producing web site trend analysis data, the method comprising:
   initializing an emulated distribution, the emulated distribution having data reflecting decisions made by visitors during an emulated traversal of a web site;

randomly selecting a number of emulated visitors from the emulated distribution;

traversing the web site using the randomly selected emulated visitors the emulated traversal of the web site by a visitor comprising:

selecting at random an entry page from an entry page distribution;

specifying a maximum clickstream length by randomly selecting a clickstream length from a clickstream lifespan distribution if the clickstream lifespan distribution is enabled;

entering the web site at the selected entry page;

traversing the web site comprising:

generating a list of candidate links a candidate link being a link choice available to a visitor on a page of the web site;

selecting a candidate link from the list;

traversing the candidate link comprising enabling page preference distribution;

retrieving a link preference distribution for a current page;

weighing each candidate link using link preference distribution for the current page, and ignoring any candidate link with a specified weight; and selecting at random an allowable candidate link from the allowable weighted candidate links;

selecting only candidate links that are allowable links; and ending the emulation session.

30. The medium recited in claim 27, traversing a candidate link comprising:

enabling global link preference distribution;

sorting candidate links by position on a page;

weighing each candidate link using the global link preference distribution; and selecting at random an allowable candidate link from the allowable weighted candidate links.

31. The medium recited in claim 27, traversing a candidate link comprising:

if link type preference distribution is enabled, then:
  sorting candidate links by type;
  weighing each candidate link using link preference distribution by link type, and ignoring any candidate link with a specified weight;
  weighing candidate links by a uniform distribution where each candidate is equally as likely;
  selecting allowable candidate links from the weighed candidate links; and
  selecting at random an allowable candidate link from the allowable weighed candidate links;

if page preference distribution is enabled, then:
  retrieving a link preference distribution for a current page is selected, then:
  weighing each candidate link using link preference distribution for the current page, and ignoring any candidate link with a specified weight; and
  selecting at random an allowable candidate link from the allowable weighted candidate links;

if global link preference distribution is enabled, then:
  sorting candidate links by position on a page;
  weighing each candidate link using the global link preference distribution; and
  selecting at random an allowable candidate link from the allowable weighted candidate links.

32. The medium recited in claim 28, ending the emulation session comprising:

ending the emulation session if all allowable weighted link candidates have been traversed.

33. The medium recited in claim 29, ending the emulation session comprising:

if the clickstream lifespan distribution is enabled, ending the emulation session;

otherwise, if a local clickstream lifespan distribution is enabled, choosing randomly whether or not to end the emulation session based upon a most relevant local distribution.

34. The medium recited in claim 30 ending the emulation session comprising:

if an emulation session length has reached the global maximum, ending the session.

35. The medium recited in claim 31, ending the emulation session comprising:

if a link preference distribution by link type is enabled, ending the emulation session if all allowable weighted link candidates have been traversed;

if the clickstream lifespan distribution is enabled, ending the emulation session;

if a local clickstream lifespan distribution is enabled, choosing randomly whether or not to end the emulation session based upon a most relevant local distribution; and if an emulation session length has reached the global maximum, ending the session.

36. The medium of claim 24, the emulated traversal of a web site by a visitor comprising:

selecting at random an entry page from an entry page distribution;

specifying a maximum clickstream length by randomly selecting a clickstream length from a clickstream lifespan distribution if the clickstream lifespan distribution is enabled;

entering the web site at the selected entry page; and traversing the web site.

37. The medium recited in claim 36, traversing a web site comprising:

generating a list of candidate links, where a candidate link is a link choice available on a page of the web site;

selecting a candidate link from the list; and traversing the candidate link.

38. The medium recited in claim 37, the method further comprising selecting only candidate links that are allowable links.

39. The medium recited in claim 38, traversing a candidate link comprising:

enabling link type preference distribution;

sorting candidate links by type;

weighing each candidate link using link preference distribution by link type, and ignoring any candidate link with a specified weight;

weighing candidate links by a uniform distribution where each candidate is equally as likely;

selecting allowable candidate links from the weighed candidate links; and selecting at random an allowable candidate link from the allowable weighed candidate links.

40. The medium recited in claim 39, traversing a candidate link comprising:

enabling page preference distribution;

retrieving a link preference distribution for a current page;

weighing each candidate link using link preference distribution for the current page, and ignoring any candidate link with a specified weight; and selecting at random an allowable candidate link from the allowable weighted candidate links.

41. The medium recited in claim 39, traversing a candidate link comprising:

enabling global link preference distribution;

sorting candidate links by position on a page;

weighing each candidate link using the global link preference distribution; and selecting at random an allowable candidate link from the allowable weighted candidate links.

42. The medium recited in claim 38, traversing a candidate link comprising:

if link type preference distribution is enabled, then:
  sorting candidate links by type;
  weighing each candidate link using link preference distribution by link type, and ignoring any candidate link with a specified weight;
  weighing candidate links by a uniform distribution where each candidate is equally as likely;
  selecting allowable candidate links from the weighed candidate links; and
  selecting at random an allowable candidate link from the allowable weighed candidate links;

if page preference distribution is enabled, then:
  retrieving a link preference distribution for a current page is selected, then:
  weighing each candidate link using link preference distribution for the current page, and ignoring any candidate link with a specified weight; and
  selecting at random an allowable candidate link from the allowable weighted candidate links;

if global link preference distribution is enabled, then:
  sorting candidate links by position on a page;
  weighing each candidate link using the global link preference distribution; and
  selecting at random an allowable candidate link from the allowable weighted candidate links.

43. The medium recited in claim 39, ending the emulation session comprising:

ending the emulation session if all allowable weighted link candidates have been traversed.

44. The medium recited in claim 40, ending the emulation session comprising:

if the clickstream lifespan distribution is enabled, ending the emulation session;

otherwise, if a local clickstream lifespan distribution is enabled, choosing randomly whether or not to end the emulation session based upon a most relevant local distribution.

45. The medium recited in claim 43, ending the emulation session comprising:

if an emulation session length has reached the global maximum, ending the session.

46. The medium recited in claim 44, ending the emulation session comprising:

if a link preference distribution by link type is enabled, ending the emulation session if all allowable weighted link candidates have been traversed;

if the clickstream lifespan distribution is enabled, ending the emulation session;

if a local clickstream lifespan distribution is enabled, choosing randomly whether or not to end the emulation session based upon a most relevant local distribution; and if an emulation session length has reached the global maximum, ending the session.

47. A computer-driven system to emulated behavior of web site visitors for producing web site trend analysis data, the system comprising:

a storage;

a processor;

circuitry communicatively coupling the storage to the processor, the processor being capable of assisting in the emulation of web site visitor behavior by:

initializing an emulated distribution, the emulated distribution having data reflecting decisions made by emulated visitors during an emulated traversal of a web site and selecting a subset of a distribution to be emulated;

creating an emulated distribution including an entry page distribution, the emulated distribution emulating distribution and transition probabilities for selected actions of an emulated visitor;

speciyfing a maximum clickstream length; and storing the emulated distributions;

randomly selecting a number of emulated visitors from the emulated distribution;

traversing the web site using the randomly selected emulated visitors; and ending the emulation session.

48. A computer-driven system to emulated behavior of web site visitors for producing web site trend analysis data, the system comprising:

a storage;

a processor;

circuitry communicatively coupling the storage to the processor, the processor being capable of assisting in the emulation of web site visitor behavior by:

initializing an emulated distribution, the emulated distribution having data reflecting decisions made by emulated visitors during an emulated traversal of a web site;

said emulated traversal of the web site by a visitor comprising:
  selecting at random an entry page from an entry page distribution;
  specifying a maximum clickstream length by randomly selecting a clickstream length from a clickstream lifespan distribution if the clickstream lifespan distribution is enabled;
  entering the web site at the selected entry page; and
  traversing the web site;

randomly selecting a number of emulated visitors from the emulated distribution;

traversing the web site using the randomly selected emulated visitors; and ending the emulation session.

49. The system recited in claim 48, traversing the web site comprising:

generating a list of candidate links, a candidate link being a link choice available to a visitor on a page of the web site;

selecting a candidate link from the list; and traversing the candidate link.

50. The system recited in claim 49, the method further comprising selecting only candidate links that are allowable links.

51. The system recited in claim 50, traversing a candidate link comprising:

enabling link type preference distribution;

sorting candidate links by type;

weighing each candidate link using link preference distribution by link type, and ignoring any candidate link with a specified weight;

weighing candidate links by a uniform distribution where each candidate is equally as likely;

selecting allowable candidate links from the weighed candidate links; and selecting at random an allowable candidate link from the allowable weighed candidate links.

52. A computer-driven system to emulated behavior of web site visitors for producing web site trend analysis data, the system comprising:

a storage;

a processor;

circuitry communicatively coupling the storage to the processor, the processor being capable of assisting in the emulation of web site visitor behavior by:

initializing an emulated distribution, the emulated distribution having data reflecting decisions made by emulated visitors during an emulated traversal of a web site;

randomly selecting a number of emulated visitors from the emulated distribution by:

selecting at random an entry page from an entry page distribution;

specifying a maximum clickstream length by randomly selecting a clickstream length from a clickstream lifespan distribution if the clickstream lifespan distribution is enabled;

entering the web site at the selected entry page; and traversing the web site comprising generating a list of candidate links, a candidate link being a link choice available to a visitor on a page of the web site;

selecting a candidate link from the list and selecting only candidate links that are allowable links; and traversing the candidate link comprising enabling page preference distribution;

retrieving a link preference distribution for a current page;

weighing each candidate link using link preference distribution for the current page, and ignoring any candidate link with a specified weight; and selecting at random an allowable candidate link from the allowable weighted candidate links;

traversing the web site using the randomly selected emulated visitors; and ending the emulation session.

53. The system recited in claim 50, traversing a candidate link comprising:

enabling global link preference distribution;

sorting candidate links by position on a page;

weighing each candidate link using the global link preference distribution; and selecting at random an allowable candidate link from the allowable weighted candidate links.

54. The system recited in claim 50, traversing a candidate link comprising:

if link type preference distribution is enabled, then:
sorting candidate links by type;
weighing each candidate link using link preference distribution by link type, and ignoring any candidate link with a specified weight;
weighing candidate links by a uniform distribution where each candidate is equally as likely;
selecting allowable candidate links from the weighed candidate links; and
selecting at random an allowable candidate link from the allowable weighed candidate links;

if page preference distribution is enabled, then:
retrieving a link preference distribution for a current page is selected, then:
weighing each candidate link using link preference distribution for the current page, and ignoring any candidate link with a specified weight; and
selecting at random an allowable candidate link from the allowable weighted candidate links;

if global link preference distribution is enabled, then:
sorting candidate links by position on a page;
weighing each candidate link using the global link preference distribution; and
selecting at random an allowable candidate link from the allowable weighted candidate links.

55. The system recited in claim 51 ending the emulation session comprising:

ending the emulation session if all allowable weighted link candidates have been traversed.

56. The system recited in claim 52, ending the emulation session comprising:

if the clickstream lifespan distribution is enabled, ending the emulation session;

otherwise, if a local clickstream lifespan distribution is enabled, choosing randomly whether or not to end the emulation session based upon a most relevant local distribution.

57. The system recited in claim 53, ending the emulation session comprising:

if an emulation session length has reached the global maximum, ending the session.

58. The system recited in claim 54, ending the emulation session comprising:

if a link preference distribution by link type is enabled, ending the emulation session if all allowable weighted link candidates have been traversed;

if the clickstream lifespan distribution is enabled, ending the emulation session;

if a local clickstream lifespan distribution is enabled, choosing randomly whether or not to end the emulation session based upon a most relevant local distribution; and if an emulation session length has reached the global maximum, ending the session.

59. The system of claim 47, the emulated traversal of a web site by a visitor comprising:

selecting at random an entry page from an entry page distribution;

specifying a maximum clickstream length by randomly selecting a clickstream length from a clickstream lifespan distribution if the clickstream lifespan distribution is enabled;

entering the web site at the selected entry page; and traversing the web site.

60. The system recited in claim 59, traversing a web site comprising:

generating a list of candidate links, where a candidate link is a link choice available on a page of the web site;

selecting a candidate link from the list; and traversing the candidate link.

61. The system recited in claim 60, the method further comprising selecting only candidate links that are allowable links.

62. The system recited in claim 61, traversing a candidate link comprising:

enabling link type preference distribution;
sorting candidate links by type;
weighing each candidate link using link preference distribution by link type, and ignoring any candidate link with a specified weight;
weighing candidate links by a uniform distribution where each candidate is equally as likely;
selecting allowable candidate links from the weighed candidate links; and
selecting at random an allowable candidate link from the allowable weighed candidate links.

63. The system recited in claim 61, traversing a candidate link comprising:
enabling page preference distribution;
retrieving a link preference distribution for a current page;
weighing each candidate link using link preference distribution for the current page, and ignoring any candidate link with a specified weight; and
selecting at random an allowable candidate link from the allowable weighted candidate links.

64. The system recited in claim 61, traversing a candidate link comprising:
enabling global link preference distribution;
sorting candidate links by position on a page;
weighing each candidate link using the global link preference distribution; and
selecting at random an allowable candidate link from the allowable weighted candidate links.

65. The system recited in claim 61, traversing a candidate link comprising:
if link type preference distribution is enabled, then:
sorting candidate links by type;
weighing each candidate link using link preference distribution by link type, and ignoring any candidate link with a specified weight;
weighing candidate links by a uniform distribution where each candidate is equally as likely;
selecting allowable candidate links from the weighed candidate links; and
selecting at random an allowable candidate link from the allowable weighed candidate links;
if page preference distribution is enabled, then:
retrieving a link preference distribution for a current page is selected, then:
weighing each candidate link using link preference distribution for the current page, and ignoring any candidate link with a specified weight; and
selecting at random an allowable candidate link from the allowable weighted candidate links;
if global link preference distribution is enabled, then:
sorting candidate links by position on a page;
weighing each candidate link using the global link preference distribution; and
selecting at random an allowable candidate link from the allowable weighted candidate links.

66. The system recited in claim 62, ending the emulation session comprising:
ending the emulation session if all allowable weighted link candidates have been traversed.

67. The system recited in claim 63, ending the emulation session comprising:
if the clickstream lifespan distribution is enabled, ending the emulation session;
otherwise, if a local clickstream lifespan distribution is enabled, choosing randomly whether or not to end the emulation session based upon a most relevant local distribution.

68. The system recited in claim 64, ending the emulation session comprising:
if an emulation session length has reached the global maximum, ending the session.

69. The system recited in claim 65, ending the emulation session comprising:
if a link preference distribution by link type is enabled, ending the emulation session if all allowable weighted link candidates have been traversed;
if the clickstream lifespan distribution is enabled, ending the emulation session;
if a local clickstream lifespan distribution is enabled, choosing randomly whether or not to end the emulation session based upon a most relevant local distribution; and
if an emulation session length has reached the global maximum, ending the session.

70. An apparatus for emulating behavior of web site visitors for producing web site trend analysis data, the apparatus comprising:
storage means for storing data;
a processing means for processing data, the processing means assisting in the emulation of web site visitor behavior by:
initializing an emulated distribution, the emulated distribution having data reflecting decisions made by emulated visitors during an emulated traversal of a web site and selecting a subset of a distribution to be emulated;
creating an emulated distribution including an entry page distribution, the emulated distribution emulating distribution and transition probabilities for selected actions of an emulated visitor;
specifying a maximum clickstream length; and
storing the emulated distributions;
randomly selecting a number of emulated visitors from the emulated distribution;
traversing the web site using the randomly selected emulated visitors; and ending the emulation session.

71. An apparatus for emulating behavior of web site visitors for producing web site trend analysis data, the apparatus comprising:
storage means for storing data;
a processing means for processing data, the processing means assisting in the emulation of web site visitor behavior by:
initializing an emulated distribution, the emulated distribution having data reflecting decisions made by emulated visitors during an emulated traversal of a web site, said emulated traversal of the web site by a visitor comprising:
selecting at random an entry page from an entry page distribution;
specifying a maximum clickstream length by randomly selecting a clickstream length from a clickstream lifespan distribution if the clickstream lifespan distribution is enabled;
entering the web site at the selected entry page; and
traversing the web site;
randomly selecting a number of emulated visitors from the emulated distribution;
traversing the web site using the randomly selected emulated visitors; and
ending the emulation session.

* * * * *